Figure 1:
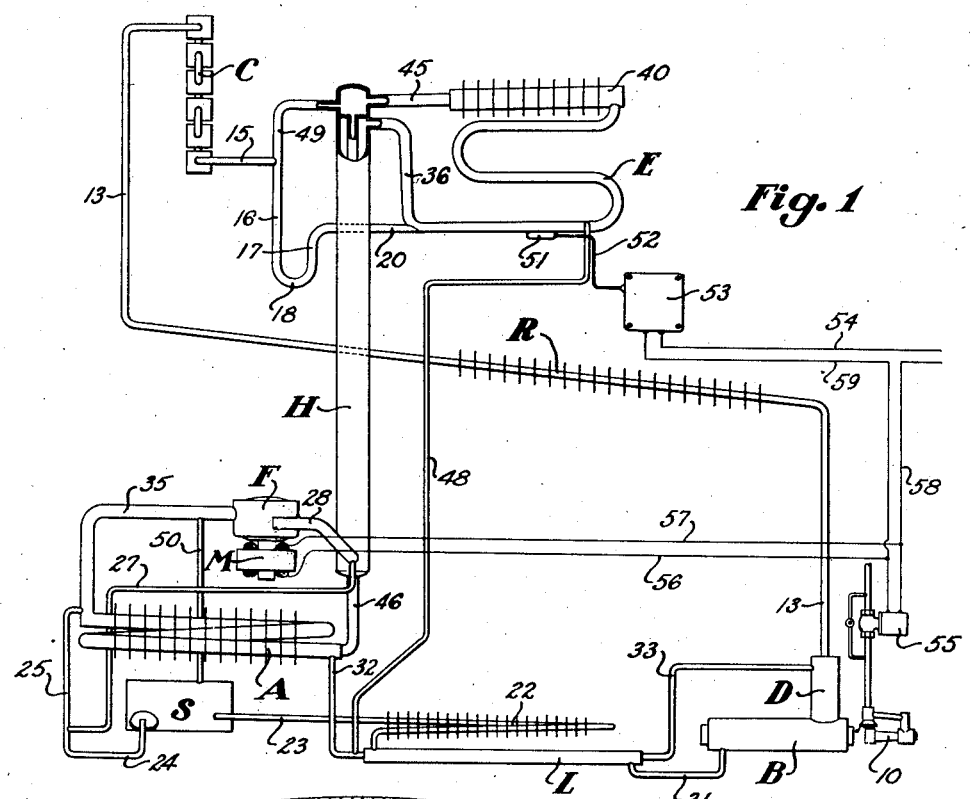

Feb. 3, 1942.    C. H. MacFARLAND    2,271,563
REFRIGERATION
Filed Feb. 5, 1940

INVENTOR
*Charles H. Mac Farland*
BY
*Harry S. Dunaven*
ATTORNEY

Patented Feb. 3, 1942

2,271,563

UNITED STATES PATENT OFFICE 2,271,563

REFRIGERATION

Charles H. MacFarland, Springfield, Mass., assignor to The Hoover Company, North Canton, Ohio, a corporation of Ohio Application February 5, 1940, Serial No. 317,389

40 Claims. (Cl. 62—5)

This invention relates to a refrigerating apparatus and control means therefor and more particularly to a three-fluid absorption refrigerating apparatus having power driven means for circulating the mediums in the apparatus with control means for the boiler heating means and for the circulating means so constructed that the operation of the circulating means is delayed an appreciable time after the boiler heater is energized.

In absorption refrigerating apparatus of the type using a motor circulating unit for circulating an inert medium between the evaporator and absorber, the solution between the boiler and absorber and the liquid refrigerant along the evaporator, it has been the usual practice to start simultaneously the operation of the boiler and the motor circulating unit. This practice has the disadvantage that the mediums are being circulated before the boiler is at an operating temperature resulting in a decreased efficiency since no refrigeration can be produced until the boiler has reached its operating temperature to distill off refrigerant vapor for condensation in the condenser.

The circulation of the cold solution from the absorber to the boiler also has the effect of cooling the boiler and this further delays the starting time since the heater must also heat this cool solution before the boiler reaches its operating temperature, thus reducing the operating efficiency of the apparatus. The circulation of weak, warm solution from the boiler to the absorber also has the effect of heating the absorber and thus throwing an additional heat load thereon which must be dissipated before the absorber can efficiently absorb refrigerant vapor from the inert medium refrigerant vapor mixture circulating therethrough. Since the inert medium being circulated at this time contains little refrigerant vapor to be absorbed, the solution leaving the absorber and returning to the boiler will be comparatively weak which will result in a further decrease in the efficiency of the apparatus.

The circulation of warm inert medium from the absorber to the evaporator acts to heat the evaporator before any liquid refrigerant is produced to cool it by the evaporation of the refrigerant. The apparatus thus operates to pump heat from the boiler to the evaporator and further reduce the efficiency of the apparatus.

It is therefore an object of this invention to provide an absorption refrigerating apparatus having a motor circulating unit for circulating the mediums in the apparatus in which the operation of the motor circulating unit is delayed until the boiler is at an operating temperature and to produce this delay by submerging the motor rotor in a solid lubricant having a heat of fusion relative to the heating rate of the boiler and the heating effect of the motor field such that the motor rotor is blocked until the boiler reaches an operating temperature.

It is another object of this invention to provide a control for an absorption refrigerating apparatus having a motor fan unit for circulating the mediums in the apparatus, the rotor of which is submerged in a solid lubricant which comprises simultaneously energizing the heater for the boiler and the motor, and applying heat to the motor lubricant to control the period in which the motor rotor is blocked.

In absorption refrigerating apparatus of the type using power means for circulating the mediums in the apparatus, it is essential that the parts of the motor be protected from the corrosive action of the refrigerant.

It is therefore another object of this invention to place the motor fan unit in that part of the circulating system normally inaccessible to liquid mediums and to immerse the rotor in a lubricant whereby the motor parts are protected from the corrosive action of the refrigerant and the lubricant cannot be diluted by the liquid mediums in the apparatus.

It is another object of this invention to control the operation of the motor by energizing the motor field and delaying the rotation of the motor thereof by means responsive to the energy of the motor field and, more particularly, in which the energy responsive means is a lubricant non-fluid at ordinary temperature and fluid at the operating temperatures of the motor.

In absorption refrigerating apparatus using a motor fan circulating unit, it is necessary that the lubricant be retained in the motor shell both during shipment and at other idle periods.

It is therefore another object of this invention to provide an absorption refrigerating apparatus in which the lubricant for the moving parts thereof is not displaceable by the liquid mediums in the apparatus by reason of being non-fluid at certain times or by being heavier than the liquids in the apparatus whereby the refrigerating apparatus can be tipped without losing the oil from the motor fan unit and is retained in its normal position at other times.

It is also an object of this invention to provide an improved motor fan for circulating the medium in an absorption refrigerating apparatus in which the rotor is positioned in the interior of the apparatus and submerged in a solid lubricant and the stator is positioned outside the system walls.

Figure 2:
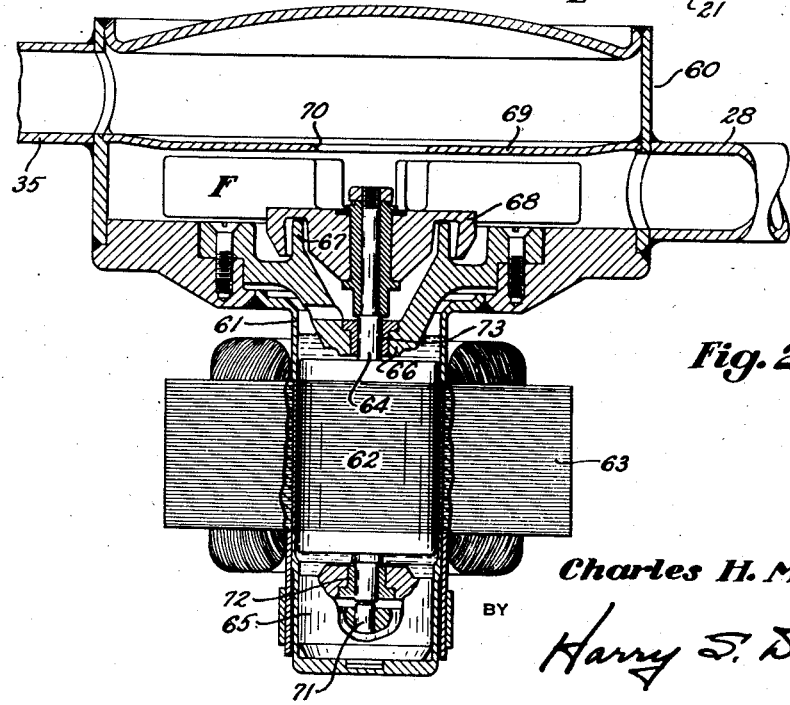

Other objects and advantages of this invention will become apparatus as the description proceeds when taken in connection with the accompanying drawing in which:

Figure 1 is a diagrammatic view of an absorption refrigerating apparatus using a motor fan circulating unit for circulating the mediums in the apparatus with the control of this invention applied thereto, and Figure 2 is a cross-sectional view of the motor fan unit according to this invention.

Referring to Figure 1 of the drawing, there is disclosed a three-fluid absorption refrigerating system comprising a boiler B, an analyzer D, an air-cooled rectifier R, a tubular air-cooled vertically positioned condenser C, an evaporator E, a gas heat exchanger H, a tubular air-cooled absorber A, a solution reservoir S, a liquid heat exchanger L and a circulating fan F which is driven by an electrical motor M. The above described elements are interconnected by various conduits to form a plurality of gas and liquid circuits constituting a complete refrigerating system to which reference will be made in more detail hereinafter.

The refrigerating system will be charged with a suitable refrigerant, such as ammonia, a suitable absorbent, such as water, and a suitable inert pressure equalizing medium, such as nitrogen.

The boiler B will be heated in any suitable manner as by an electric cartridge heater or by a gas burner 10 controlled in a manner to be described later.

The application of heat to the boiler B liberates refrigerant vapor from the strong solution therein. The vapor so liberated passes upwardly through an analyzer D in counterflow relationship to a strong solution flowing downwardly through the analyzer. Further refrigerant vapor is generated in the analyzer by the heat of condensation of absorption solution vapor generated in the boiler. The refrigerant vapor is conducted from the upper portion of the analyzer D to the upper portion of the condenser C through a conduit 13 which includes the air-cooled rectifier R wherein any vapor of absorption solution passing through the analyzer is condensed and returned to the analyzer through the conduit 13. The refrigerant vapor is liquefied in the condenser by heat exchange relation with atmospheric air and is discharged from the bottom portion through a conduit 15 into a downwardly extending conduit 16. The bottom portion of the conduit 16 connects with the bottom portion of an upwardly extending conduit 17 through a U-bend 18. The conduit 16 is longer than the conduit 17 for a purpose to be described later. The conduit 17 opens at its upper end into a conduit 20 which discharges into the evaporator in a manner to be more fully described later.

The weak solution formed in the boiler by the generation of refrigerant vapor therefrom is conveyed from the boiler through a conduit 21, the outer pass of the liquid heat exchanger L, an air-cooled pre-cooler 22 and a conduit 23 into the solution reservoir S. The weak solution is conveyed from the solution reservoir S through a U-shaped conduit 24 which opens into the gas lift pump 25 which in turn discharges into the upper portion of the absorber A. It is apparent that the top of absorber A is materially above the solution level normally prevailing in the boiler-analyzer reservoir system whereby some means must be provided to elevate the absorption solution into the top of the absorber A. For this purpose a small bleed conduit 27 is connected to the discharge conduit 28 of the circulating fan F and opens into the gas lift pump 25 below the solution level normally prevailing in the reservoir whereby the weak solution is elevated into the top of the absorber by gas lift action.

In the absorber, the weak solution flows downwardly by gravity in counterflow relation to the rich pressure equalizing medium refrigerant vapor mixture flowing upwardly therethrough. The refrigerant vapor content of the mixture is absorbed in the absorption solution and the heat of absorption is conducted to the surrounding air by air cooling fins which are mounted on the exterior of the absorber vessel. The strong solution formed in the absorber flows into a conduit 32 which opens into the inner pass of the liquid heat exchanger L. From the inner pass of the liquid heat exchanger L, the strong solution is conveyed to the upper portion of the analyzer D by a strong solution return pipe 33.

The lean pressure equalizing medium refrigerant vapor mixture formed in the absorber A is taken from the upper portion thereof through the conduit 35 into the suction side of the circulating fan F in which it is placed under pressure and discharged through the conduit 28 into the outer pass of the gas heat exchanger H. The pressure equalizing medium under pressure is conveyed from the outer pass of the gas heat exchanger H through a downwardly extending conduit 36 into the bottom portion of the evaporator E.

The conduit 20 opens into the bottom portion of the conduit 36 whereby the liquid refrigerant supplied to the evaporator enters the same simultaneously with the pressure equalizing medium which is placed under pressure by the circulating fan F. The conduit forming the lower part of the evaporator is relatively small whereby the pressure equalizing medium flows through such evaporator conduit with a velocity which is comparatively high. The rapidly flowing pressure equalizing medium sweeps or drags the liquid refrigerant with it through the evaporator into the box cooling portion 40 as the refrigerant is evaporating to produce refrigeration by diffusion into the inert medium. In the conduit 40 the velocity of the inert gas stream is relatively low by reason of the large diameter of that conduit, and the liquid refrigerant flows therethrough by gravity.

The rich pressure equalizing medium refrigerant vapor mixture formed in the evaporator is conducted therefrom into the inner pass of the gas heat exchanger H through a conduit 45. The opposite end of the inner pass of the gas heat exchanger H communicates with the bottom portion of the absorber A through a conduit 46. In the absorber A, the rich pressure equalizing medium refrigerant vapor mixture flows upwardly in counterflow to absorption solution which absorbs the refrigerant vapor content of the mixture.

Any refrigerant unevaporated in the evaporator E will flow through the conduit 45, the inner pass of the gas heat exchanger H and conduit 46 to the bottom of the absorber. Since the motor fan unit is in the opposite part of the pressure equalizing medium circuit, this unevaporated refrigerant cannot reach the motor fan unit and interfere with its operation.

The conduit 16 is made longer than the conduit 17 so as to form a pressure equalizing column of liquid to prevent the pressure built up by the fan F from being blown back through the condenser C.

The bottom coil of the evaporator E is provided with a drain conduit 48 which opens into the strong solution return conduit 32. The conduit 48 opens into the top portion of the evaporator coil whereby it will not completely drain such conduit.

The discharge conduit 15 of the condenser is vented through a vent conduit 49 into the inner pass of the gas heat exchanger H. The solution reservoir S is vented through a conduit 50 into the suction conduit 35 of the circulating fan.

The bleed conduit 27 which leads to the gas lift pump is so connected to the discharge conduit 28 of the fan F that any liquid mediums condensed in the outer pass of the heat exchanger H and conduit 28 will be conducted back to the solution circuit and thus not interfere with the operation of the motor-fan unit.

A thermostatic bulb 51 is positioned against the coils of the evaporator E and connected by a tube 52 to a control device 53. One side of the control device 53 is connected by a conductor 54 to one side of the power line. The opposite side of the control device 53 is connected by conductor 59 to a magnetically operated gas valve 55 and by conductor 56 to one side of the motor field coils. The opposite side of the motor field coils and the magnetic valve 55 is connected by conductors 57 and 58 to the opposite side of the power line. A low flame by-pass may be provided, by-passing the valve 55 to provide a minimum flame to the burner 10 during idle periods.

Referring to Figure 2, the motor fan unit comprises a casing 60 for the fan and a shell 61 separating the motor rotor 62 and the motor stator 63; the portion of the shell 61 between the rotor and stator being made quite thin to reduce the effective air gap between the rotor and stator and is supported against internal pressure by the stator 63 being pressed tightly thereover. The rotor 62 is rigidly connected to the fan F by a shaft 64 which is rotatably supported on the interior of the casing by bearing assemblies 65 and 66. The lower bearing assembly includes a two part thrust bearing 71 of very hard material such as tungsten carbide and a large clearance Babbitt radial bearing 72. The top bearing assembly 66 also includes a large clearance Babbitt radial bearing 73. The shaft 64 is preferably made of stainless steel.

Formed as a part of the bearing assembly 66 is an annular upstanding wall 67 surrounded by a throw-off ring 68 formed as a part of the fan F. The upstanding wall 67 extends above the bottom of outlet conduit 28 so as to form a drain for the fan housing. The fan housing is divided into a suction chamber and a high pressure chamber by plate 69 having an aperture 70 leading to the suction side of the fan.

The shell 61 on its interior is filled with a lubricant to the level shown which lubricant is non-fluid at ordinary temperatures but fluid at the operating temperature of the motor.

The lubricant selected should be chemically inert; it should not be volatile at normal temperature; it should be solid or non-fluid at normal temperature or indisplaceable so that it will not get out of the motor during shipment; it should be fluid and have a low viscosity at the operating temperature of the motor; it should not be miscible with water and it should have good lubricating properties.

One such lubricant is paraffin and it is obtainable in a long range of melting points and specific gravity. By selecting paraffin of the proper melting point or by mixing it with other lubricants, almost any melting point desired can be obtained. By mixing paraffin with other well known high specific gravity lubricants, a lubricant can be obtained which has a specific gravity greater than 1.0 so that it will not be displaceable by the liquid mediums in the apparatus, which lubricant will be in a solid state at normal temperature so that it will not get out of the motor during shipment and which will be fluid at the operating temperature of the motor to provide for proper lubrication of the motor without materially retarding the rotation of the rotor.

By submerging the rotor 62 in a liquid medium such as a lubricant, the rotor centers itself as it reaches its operating speed. This is due to the fact that if the rotor is off center at the beginning of its operation, the liquid will tend to rotate with the rotor and be drawn between the rotor 62 and shell 61 at the point where the rotor is closest to the shell and move the rotor away from the shell at that point. This action will continue until the rotor is completely centralized. It is to be noted that the space between the rotor and shell when the rotor is centered is very small and may be only a few thousandths of an inch.

The fact that the action of the lubricant automatically centers the rotor renders it possible to make the radial Babbitt bearings 72 and 73 with a much larger clearance between their bearing surfaces and that of the shaft 64 than would otherwise be possible. Thus the bearing surfaces are only in contact when the rotor is starting and the wear thereon will be negligible.

The buoyant effect of the lubricant or other liquid will also lighten the load on the thrust bearing 71 and thereby reduce the wear thereon. Since the radial bearings are out of contact with the shaft during operation a much quieter motor will result.

When the system shuts down the lubricant in the shell 61 will solidify. Now if the machine calls for refrigeration, the control 53 will simultaneously energize the magnetic valve 55 to supply gas to the burner 10 and also energize the field coils of the motor. The motor rotor, being blocked by the solid lubricant, cannot operate to rotate the fan F and therefore no inert pressure equalizing medium will be circulated in its circuit with the result that the gas lift pump 25 will not operate to circulate the solution between the boiler and absorber, nor will any liquid refrigerant be circulated through the evaporator E. The heating effect of the motor field may remain fixed and the melting point of the lubricant be varied or the melting point of the lubricant be selected and the heating effect of the field be varied to predetermine the time interval the rotor remains blocked. The melting point of the lubricant should be so selected relative to the heating rate of the boiler and the heating effect of the motor field that the lubricant will be melted by the time the boiler has come up to operating temperature.

If a lubricant having the proper melting point is selected, relative to the heating rate of the boiler and the heating effect of the motor field, the motor fan unit will remain blocked until the boiler has reached an operating temperature, at which time liquid refrigerant will be supplied from the condenser through tube 20 to the evaporator E. The inert gas put under pressure by the fan F will flow through the tube 36 into the evaporator together with the refrigerant and the refrigerant will be blown along the evaporator coils to produce refrigeration by diffusion into the inert medium. Any liquid refrigerant not evaporated in the evaporator will flow through tube 45, the inner pass of the gas heat exchanger and tube 46 to the bottom of the absorber A so as not to interfere with the operation of the motor fan unit. At the same time a portion of the inert medium will flow through tube 27 to gas lift pump 25 and thereby circulate the absorption solution between the boiler and absorber as previously described.

Since the absorption solution is not being circulated until the boiler reaches an operative temperature, the cold solution from the absorber will not operate to cool the boiler and thereby the boiler will come up to a proper operative temperature sooner than it would if the motor fan is operated simultaneously with the heater. The warm inert medium will not be circulated from the absorber to the evaporator and therefore the evaporator will remain in its cold state until refrigeration is being produced therein.

Any liquid medium which may condense in the outer pass of the gas heat exchanger H and conduit 28 will be collected in the bottom thereof and cannot flow into the motor fan unit. Any liquid which condenses in the fan casing 60 will be thrown off by the throw-off ring 68 before it can enter the motor shell 61 and dilute the lubricant. The condensed mediums which may collect in the bottom of the gas heat exchanger will flow through the bleed conduit 27 back to the solution circuit. When the machine begins operation again, the liquid medium in the fan casing will soon be evaporated by diffusion into the inert pressure equalizing medium flowing to the gas heat exchanger and therefore cannot accumulate so as to interfere with the operation of the motor fan unit. Since the wall 67 is above the bottom of outlet 28 no liquid medium can enter the motor shell and dilute or displace the lubricant therein.

The motor fan unit is fabricated, filled to the desired level with fused lubricant, and suitably secured to the remainder of the apparatus. The lubricant then congeals and the system is charged in the usual manner. It can thus be seen that the refrigerating apparatus can be shipped and otherwise handled and the lubricant will remain in the motor shell. When the apparatus is in operating position the motor shell will be vertical and the lubricant will remain therein. Also the motor-fan unit is positioned so as to be inaccessible to liquid mediums during operating conditions.

From the foregoing it can be seen that this invention provides a refrigerating apparatus having a motor fan circulating unit for circulating the mediums in the apparatus and in which the motor rotor is submerged in a lubricant to protect it against the corrosive action of the refrigerant and which is not displaceable by the liquid mediums in the system, and which cannot get out of the motor shell during shipment.

It can also be seen that this invention provides an absorption refrigerating apparatus having a motor circulator unit in which the operation of the motor circulator unit is delayed until the boiler is up to an operating temperature and in which the delay is accomplished or controlled in part by the heating effect of the motor field and in part by the heat of fusion of the lubricant selected.

While I have shown my invention positioned in the inert gas circuit of a three-fluid refrigerating apparatus, it is obvious that it could be placed in the solution circuit of either a two or three-fluid refrigerating apparatus for circulating the solution alone.

While I have shown but one embodiment of my invention, it is to be understood that this embodiment is to be taken as illustrative only and not in a limiting sense. I do not wish to be limited to the particular structure shown and described but to include all equivalent variations thereof except as limited by the claims.

I claim:

1. That process of controlling the operation of a continuous absorption refrigerating apparatus of the type using a pressure equalizing medium and having heating means for the boiler and power operated means for circulating the inert medium comprising simultaneously energizing the heating means and power operated means and applying a retarding influence to the operation of said power operated means.

2. That method of operating an absorption refrigerating apparatus having a heater and means for circulating the mediums in the apparatus in which the medium circulating means includes a motor in which the rotor is submerged in a congealed lubricant which comprises simultaneously energizing the heater and medium circulating means and utilizing the heat of fusion of the lubricant to delay the operation of the medium circulating means.

3. The method of controlling the operation of an absorption refrigerating apparatus having a heater and a motor fan unit for circulating the mediums therein in which the motor rotor is submerged in a lubricant solid at ordinary temperatures but fusible at higher temperatures which comprises simultaneously energizing the heater and motor and utilizing the time interval necessary for the heat of the motor to fuse the lubricant for delaying the operation of the motor fan unit.

4. The method of controlling the operation of an absorption refrigerating apparatus of the type having a heater for the boiler and a motor fan circulator unit for circulating the mediums in the apparatus in which the motor rotor is submerged in a lubricant which is non-fluid at ordinary temperatures but which is fluid under the operating conditions of the motor comprising simultaneously energizing the heater and the motor and heating the lubricant to melt the same.

5. The method of controlling an absorption refrigerating apparatus of the type having a motor fan unit for circulating the mediums in the apparatus and having the motor rotor thereof submerged in a non-fluid lubricant and a heater for the boiler comprising simultaneously energizing the motor and the heater, utilizing the non-fluid lubricant to block the rotor until the boiler comes up to an operating temperature and utilizing the energy supplied to the motor to melt the lubricant whereby the motor fan unit becomes operative to circulate the mediums in the apparatus when the boiler reaches an operating temperature.

6. The method of controlling an absorption refrigerating apparatus of the type having a heater for the boiler and means for circulating an inert medium between the evaporator and absorber, a refrigerant solvent between the boiler and absorber and for circulating liquid refrigerant along the evaporator comprising simultaneously energizing the heater and circulating means responsive to a demand for refrigeration and delaying the circulation of the inert medium, solvent and liquid refrigerant until the boiler has reached an operating temperature.

7. The method of controlling the operation of an absorption refrigerating apparatus of the type having a heater for the boiler and an electro-magnetic circulator unit for circulating the mediums within the system comprising energizing the apparatus, delaying the operation of the circulator unit and terminating the delaying step by heat generated by the energy supplied to the apparatus.

8. The method of controlling the operation of an absorption refrigerating apparatus of the type having a heater for the boiler and an electric motor fan unit for circulating the mediums in the apparatus comprising simultaneously energizing the heater and motor fan unit, delaying the operation of the motor fan unit by blocking its rotor and terminating the delaying step by the energy supplied to the circulator unit.

9. The method of controlling the operation of an absorption refrigerating apparatus of the type having a heater for the boiler and a motor-fan unit for circulating the mediums in the apparatus comprising simultaneously energizing the heater and the motor-fan unit, delaying the operation of the motor fan unit by blocking the motor rotor with a lubricant solid at ordinary temperatures but fusible at higher temperatures and terminating the delay step by the heat of fusion of the lubricant and the energy supplied to the motor fan unit to determine the period the rotor remains blocked.

10. The method of controlling the operation of an absorption refrigerating apparatus of the type having an electro-magnetic circulator unit for circulating the mediums in the apparatus comprising energizing the circulator unit, delaying the operation of the circulator unit and utilizing the energy supplied to the circulator unit to govern the period of delay.

11. An absorption refrigerating apparatus comprising a boiler, an evaporator and an absorber, conduits connecting said evaporator and absorber to form a circuit therebetween, conduits connecting said boiler and absorber to form a circuit therebetween, a heater for said boiler, power operated means in said first-mentioned circuit for circulating an inert pressure equalizing medium in its circuit, a conduit leading from said power operated means to said second-mentioned circuit, and being so arranged therewith as to circulate a solvent between the boiler and absorber, control means for said heater and power operated means, responsive to the demand for refrigeration, said power operated means comprising a motor fan unit in which the motor rotor is submerged in a lubricant which is solid at ordinary temperatures but fusible at higher temperatures and is present in such amounts that the circulation of the inert medium and solvent is delayed until the boiler is at an operating temperature.

12. An absorption refrigerating apparatus comprising a boiler, a condenser, an evaporator and an absorber, conduits connecting said evaporator and absorber to form a circuit therebetween, conduits connecting said boiler and absorber to form a circuit therebetween, a conduit leading from said condenser to said evaporator, the top of said evaporator being positioned above the bottom of said condenser, power operated means in said circuit between the evaporator and absorber for circulating an inert pressure equalizing medium in its circuit, conduit means connecting said power operated means with the circuit between the boiler and absorber, and being so arranged relative thereto that pressure developed by said power means will circulate a solvent between the boiler and absorber, said circuit between the evaporator and absorber being so arranged relative to the conduit leading from the condenser to the evaporator that pressure developed by said power means will circulate condensed refrigerant along the evaporator, a heater for said boiler and control means for simultaneously energizing the heater and power operated means, said power operated means comprising a motor fan unit in which the motor rotor is submerged in a lubricant solid at ordinary temperatures but fusible at higher temperatures and is present in such amounts that the circulation of inert medium, solvent, and liquid refrigerant is delayed until the boiler is at an operating temperature.

13. In an absorption refrigerating apparatus of the type having a motor fan unit for circulating the mediums in the apparatus and a heater for the boiler, control means for simultaneously energizing the motor and heater, heat responsive means for blocking the motor rotor, said heat responsive means being subject to heat generated by the motor and operative to release the motor rotor a predetermined period after the motor is energized whereby the motor fan unit will be operative to circulate the mediums in the apparatus after the boiler has reached an operative temperature.

14. In an absorption refrigerating apparatus of the type having a motor fan unit for circulating the mediums in the apparatus and a heater for the boiler, control means for simultaneously energizing the motor and the heater, means associated with the motor for blocking the motor rotor, said means being responsive to the energy supplied to the motor and operative to release the motor a predetermined period after the motor is energized, whereby the motor fan unit will be operative to circulate the mediums in the apparatus when the boiler reaches an operative temperature.

15. An absorption refrigerating apparatus of the type using a motor driven medium circulator and a heater for the boiler, a control for energizing the apparatus including means associated with the apparatus responsive to a temperature rise resulting from the energizing of the apparatus and constructed to delay the operation of the motor driven circulator for a period after the energization of the apparatus.

16. An absorption refrigerating apparatus of the type using a motor-fan unit for circulating both the absorption solution between the boiler and absorber and a pressure equalizing medium between the evaporator and absorber and a heater for the boiler, a control for energizing the apparatus including means associated with the apparatus responsive to a temperature rise incident to the energizing of the apparatus and constructed to delay the operation of the motor fan unit for a period after the energization of the apparatus whereby the circulation of absorption solution and pressure equalizing medium will be delayed until the boiler has become heated.

17. An absorption refrigerating apparatus of the type having a heater for the boiler and power operated means for circulating the solution between the boiler and absorber, said power operated means including a motor fan rotor in which the motor rotor is submerged in a lubricant solid at ordinary temperatures but fusible at higher temperatures and a control for simultaneously energizing said heater and power operated means whereby the heat of fusion of the lubricant is utilized to delay the circulation of solution until the boiler has reached an operative temperature.

18. In an electric motor, a field structure, a rotor, means for energizing the field structure and means for retarding the rotation of the rotor, said means being constructed to release its retardation of the rotor after a predetermined interval.

19. The method of starting a rotary electric motor comprising energizing the motor field structure, delaying the rotation of the rotor and utilizing the energy supplied to the motor to govern the period of delay.

20. The method of starting a rotary electric motor comprising energizing the motor field structure, blocking the rotor by submerging it in a lubricant solid at ordinary temperatures but which fuses at higher temperatures and utilizes the energy supplied to the motor and the heat of fusion of the lubricant to predetermine the period the rotor remains blocked.

21. An absorption refrigerating apparatus comprising a boiler, a condenser, an evaporator and an absorber, conduits connected to said evaporator and absorber to form an inert gas circuit between said evaporator and absorber, said apparatus being charged with a refrigerant, a liquid absorbent and an inert gas, and power operated means in said closed circuit for circulating the inert gas in said circuit, said power operated means comprising a motor rotor and fan in which the motor rotor is submerged in a lubricant, and said power operated means being positioned in a part of said inert gas circuit inaccessible to the liquid medium within the apparatus under normal operating conditions.

22. An absorption refrigerating apparatus comprising a boiler, an evaporator and an absorber, conduits connecting said evaporator and absorber to form an inert gas circuit therebetween, conduits connecting the boiler and absorber to form a solution circuit therebetween, said apparatus being charged with a refrigerant, a liquid absorbent and an inert gas, power operated means in said evaporator-absorber circuit for circulating an inert gas in said circuit, said power operated means comprising a motor rotor and fan enclosed in a casing and in which the motor rotor is submerged in a lubricant, and a conduit leading from the discharge side of said fan to lead to the boiler-absorber circuit and so related thereto as to circulate absorption solution in said circuit, said motor fan casing being positioned in a part of said evaporator-absorber circuit normally inaccessible to liquid mediums in the apparatus but subject to being flooded during idle periods, said conduit leading from the discharge side of the fan to the boiler-absorber circuit being so related to the motor fan casing as to drain any liquid accumulated in the motor fan casing, to the boiler-absorber circuit.

23. An absorption refrigerating apparatus comprising a boiler, an evaporator and an absorber, conduits connecting said evaporator and absorber to form an inert gas circuit therebetween, said apparatus being charged with a refrigerant, a liquid absorbent and an inert gas, power operated means in said circuit between the evaporator and absorber for circulating the inert gas in its circuit, said power operated means comprising a motor fan unit in which the motor rotor is submerged in a lubricant and is positioned in a part of the circuit between the evaporator and absorber which is inaccessible to any liquid medium under normal operating conditions but subject to an accumulation of liquid mediums under abnormal conditions, said motor fan unit being so arranged relative to the circuit between the evaporator and absorber that any accumulated liquid medium will drain away from the fan unit during idle periods whereby the lubricant in the motor housing will not be diluted by the liquid mediums within the system.

24. An absorption refrigerating apparatus of the type having a motor fan unit for circulating an inert medium in a circuit between the evaporator and absorber and which is also charged with liquid mediums, in which the motor fan unit is positioned in a part of the circuit normally inaccessible to the liquid mediums in the apparatus but subject to being flooded with the liquid medium when the apparatus is tipped and in which the motor rotor is submerged in a lubricant which is solid at ordinary temperatures.

25. An absorption refrigerating apparatus including a motor driven medium circulator, said motor driven medium circulator including a motor rotor submerged in a lubricant and said apparatus being charged with a refrigerant and a solvent, said lubricant being indisplaceable by the refrigerant or the solvent.

26. An absorption refrigerating apparatus including a motor fan unit for circulating the mediums in the apparatus, said motor fan unit having the motor rotor submerged in a lubricant and said apparatus being charged with a refrigerant and a solvent therefor, said motor fan unit being positioned in a part of the apparatus normally inaccessible to the liquid mediums in the apparatus but subject to be flooded thereby when the apparatus is tipped, said lubricant being indisplaceable by the liquid mediums in the apparatus.

27. An absorption refrigerating apparatus comprising an inert gas circuit and a solution circuit, a motor circulator unit for circulating a medium in one of said circuits, said circulator unit including a rotor submerged in a solid lubricant.

28. An absorption refrigerating apparatus of the type having liquid and gaseous mediums therein and closed circuits for said mediums, in combination with a circulator unit for at least one of said mediums hermetically sealed within the walls of the apparatus, said circulator unit including a motor rotor and fan, said motor rotor being submerged in a lubricant and positioned outside said circuits.

29. An absorption refrigerating apparatus comprising an evaporator and an absorber, conduits connecting said evaporator and absorber to form an inert gas circuit therebetween, said apparatus being charged with a refrigerant, an absorbent, and an inert gas, and power operated means in said circuit for circulating the inert gas in said circuit, said power operated means comprising a motor fan rotor in which the motor rotor is submerged in a lubricant non-fluid at ordinary temperatures.

30. An absorption refrigerating apparatus of the type having a motor fan unit for circulating an inert medium in a circuit between the evaporator and absorber, said motor comprising a vertically extending casing having an upper fan casing and a lower shell, a motor rotor in said shell and a motor field outside said shell supporting it against internal pressure, said shell containing a solid lubricant.

31. An absorption refrigerating apparatus including a heater for the boiler and a motor fan unit for circulating the mediums in the apparatus in which the motor fan rotor is submerged in the lubricant solid at ordinary temperatures but fusible at higher temperatures, said lubricant having a heat of fusion of such value and being present in such amount relative to the heating rate of the boiler and the power input to the motor that the heat of the motor will fuse the lubricant by the time the heater has brought the boiler to operating temperatures when the heater and motor are simultaneously energized.

32. That improvement in the art of refrigeration which comprises lubricating the moving parts of a refrigerating apparatus by means of a lubricant which is non-fluid at ordinary temperatures and liquid at the operating temperature of the apparatus, whereby the lubricant cannot be displaced by the refrigerating medium during inoperative periods.

33. That improvement in the art of lubricating motors which comprises submerging the motor rotor in a lubricant which is non-fluid at ordinary temperatures but fluid at the operating temperature of the motor.

34. A fractional horse power motor fan unit for circulating an inert medium in an absorption refrigerating apparatus comprising a vertically extending hermetically sealed casing and a motor fan rotor rotatably mounted in said casing, said motor rotor being submerged in a lubricant solid at ordinary temperatures but fusible at higher temperatures.

35. A fractional horse power motor fan unit for circulating an inert medium in an absorption refrigerating apparatus comprising a vertically extending hermetically sealed casing, a motor fan rotor rotatably mounted in said casing, and a field structure externally of said casing, said motor rotor being submerged in a lubricant, said lubricant being of such nature that it fuses due to the heat generated by said field structure.

36. A motor comprising a casing and a rotor mounted in said casing, said casing containing a lubricant solid at ordinary temperatures but fusible at higher temperatures.

37. That improvement in the art of refrigeration in which a power driven circulator is used to circulate the medium which comprises, charging a refrigerating apparatus with a liquid working medium, charging a fused lubricant into the apparatus in a position to surround the moving parts of the circulator, allowing the lubricant to congeal and re-fusing the lubricant prior to operation whereby the lubricant cannot be displaced by the liquid working medium during shipment or other inoperative periods and is in a condition to lubricate the moving parts of the circulator during operation.

38. An absorption refrigerating apparatus of the type having liquid and gaseous mediums therein and closed circuits for said mediums, in combination with a circulator unit for at least one of said mediums, said circulator unit including a movable element located in a closed casing hermetically sealed to, in open communication with and extending from one of said circuits so as to be outside the path of flow of the medium being circulated in said circuit and a lubricant in said casing whereby the movable element will be lubricated and the lubricant will not be carried along by the circulating medium to other parts of the apparatus.

39. In an absorption refrigerating apparatus of the type having liquid and gaseous mediums therein and closed circuits for said mediums, in combination with a circulator unit for at least one of said mediums, said circulator unit including a movable element located in a closed casing hermetically sealed to, in open communication with and extending from one of said circuits so as to be outside the path of flow of the medium being circulated in said circuit and a lubricant in said casing having a specific gravity higher than the medium being circulated in said circuit whereby the movable element will be lubricated and the lubricant will not be carried along with the circulating medium to other parts of the apparatus.

40. In combination, an absorption refrigerating apparatus including a closed inert gas circuit and means for circulating an inert gas in said circuit, said means including a movable element in a closed casing hermetically sealed to, in open communication with and extending from said circuit so as to be out of the path of flow of the inert gas in said circuit and said casing containing a lubricant whereby said movable element will be lubricated and the lubricant will not be entrained in the circulating inert gas and be carried to the other parts of the apparatus.

CHARLES H. MACFARLAND.